PHOTOCONDUCTOR MATERIAL AND STABILIZATION THEREOF AT LOW TEMPERATURE

Filed July 2, 1962

INVENTORS
GEORGE CHEROFF
FREDERICK HOCHBERG
ARNOLD REISMAN
BY [signature]
ATTORNEY 3,175,091

PHOTOCONDUCTOR MATERIAL AND STABILIZATION THEREOF AT LOW TEMPERATURE

George Cheroff, Peekskill, and Frederick Hochberg and Arnold Reisman, Yorktown Heights, N.Y., assignors to International Business Machines Corporation, New York, N.Y., a corporation of New York Filed July 2, 1962, Ser. No. 206,930
8 Claims. (Cl. 250—211)

Figure 1:
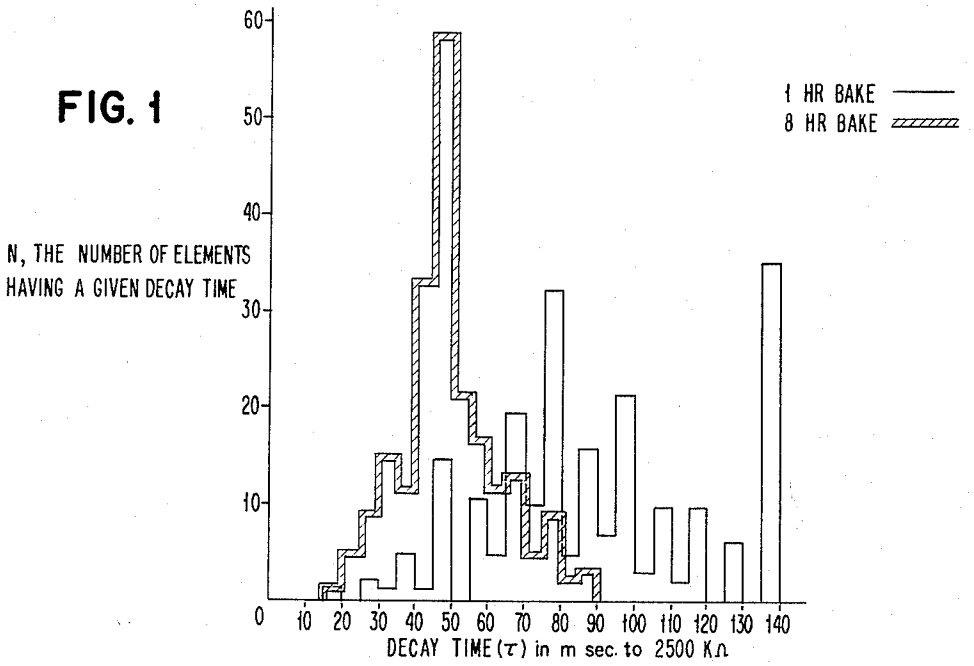

A process for increasing the room temperature stability of binary compound photoconductor polycrystalline layers, more specifically cadmium selenide. In addition, the process enables the selective increase of decay speed without adversely affecting sensitivity of the photoconductor devices.

A desirable process for preparing sintered layer polycrystalline photoconductors is one which enables selective alteration of light resistance and speed characteristics.

Normally in the preparation of sintered layer polycrystalline photoconductors, a trade off between light resistance and decay speed has to be tolerated in the defined process for fabrication. That is, when the decay response time is decreased it is invariably the case that the sensitivity of the device decreases. It would be highly desirable if these very important parameters could be selectively varied separably.

In a time-temperature sintering cycle for the fabrication of a binary compound sintered layer polycrystalline photoconductor device, the sintering material will generally acquire a vacancy count distribution of its constituents commensurate with that thermodynamically required by the sintering temperature. As the sintered device is cooled subsequent to its prime sintering part of the process, the ability of the crystalline lattice constituents to reorient will decrease, essentially freezing in a portion of the vacancies generated at the higher temperature. These frozen in vacancies, at room temperature or thereabout, are thermodynamically metastable and may represent deep trapping levels which adversely affect decay time characteristics. (Deep traps are energy states lying an appreciable distance on an energy scale, from either the valence or conduction band edges—an appreciable fraction of the band gap of the semiconductor material.)

It would be highly desirable if such vacancies could be filled so that in defining a fabrication process other parameters, for example, amount of incorporation of impurity atoms could be adjusted, such that the finished device exhibited precisely the desired electrical characteristics.

It is object of the invention to prepare photoconductor devices having enhanced decay time characteristics without imparing light resistance or sensitivity, obtainable by a defined process for fabricating photoconductor devices.

Another object of this invention is to prepare a photoconductor whose decay time at a given doping level is faster than that normally obtained but whose sensitivity is essentially as great as normally obtained.

The foregoing and other objects, features and advantages of the invention will be apparent from the following more particular description of the preferred embodiment of the invention, as illustrated in the accompanying drawing.

Based on the studies of the reaction of silver halides in the CdSe it was observed that rather than incorporation of the silver halide directly into the selenide forming a solid solution a reaction occurred according to:

$$2AgX + CdSe \rightleftarrows Ag_2Se + CdX_2$$

where X is Cl. The $Ag_2Se$ then forms a solid solution with the selenide. Since the impurity cation is monovalent and the lattice bulk cation is bivalent, it appeared that with the incorporation of two silver atoms a selenium vacancy should be generated. Because there already exist excess Se vacancies due to the thermal freezing in process described above and these excess vacancies are metastable, it was postulated that if silver is diffused into the selenide lattice at low temperatures the metastable vacancies would become stable via the mechanism for incorporation of silver described above. It should be the case that metastable vacancies should behave differently with respect to the trapping phenomena than stable vacancies, e.g. energy levels of stable and metastable vacancies are different in electron capture cross sections. It was found empirically that silver diffusion at low temperatures (less than 200° C.) exhibited the predicted changes in trapping phenomena in a highly desirable manner. It is essential that the diffusion be effected at as low a temperature as is practicably feasible. Direct incorporation in the photoconductor mix during sintering yields other results.

Silver particles in the range of sizes 200–400 mesh are admixed with a binder and a volatile vehicle. The binder is for example an epoxy resin prepared by the reaction of epichlorohydrin and bisphenol A (Epon 828). The curing agents suitable for curing the epoxy resin are for example, triethylene tetramine, dicyandiamide, methylene diamine, 4,4′ methylene dianiline etc. The volatile vehicle is Cellosolve (ethylene glycol monoethyl ether). A starting composition would be as follows: 53–54% by weight of silver, 1–2% by weight of epoxy resin (reaction product of epichlorohydrin and bisphenol A) plus curing agent (triethylene tetramine), and the remainder butyl Cellosolve. Prior to use, the slurry is brought to a Brookfield viscometer reading of 80% using a Brookfield TA spindle at 50 r.p.m. (the Brookfield viscometer is that manufactured by the Brookfield Engineering Laboratories). This may require evaporation of some of the initial solvent or addition of new solvent depending on the silver particle size employed. The slurry is screened as an electrode pattern on the sintered photoconductor layer and the substrate at room temperature. (A sintered layer photoconductor may be prepared as disclosed in Serial No. 172,699 filed February 12, 1962, now Patent No. 3,145,120, Method for Controlling Flux Pressure During Sintering Process.)

The assembly is dried at 100°–110° C. for 15 minutes to remove the bulk of the butyl Cellosolve and then placed in a circulating air oven at 165° C. for varying lengths of time depending on the final properties desired and the composition of the sintered layer photoconductor e.g. a CdSe sintered layer photoconductor containing 175 p.p.m. of Cu requires some 20 hours of baking at 165° C. before the properties, decay time, and light resistance begin to level off. A 400 p.p.m. Cu sintered layer requires 8 hours.

The effect of such treatment is to decrease the time required for the sintered layer to acquire a specified dark resistance when the light is turned off (enhanced decay time) without decreasing the sensitivity by the same factor.

Such silver diffused copper doped CdSe sintered layers are useful as components in computer logic circuits.

FIGURE 1 shows the effect of the process on the decay time of a CdSe sintered layer photoconductor doped with 175 p.p.m. Cu. The broken lines show the distribution after 1 hour of baking while the continuous lines show the distribution after 8 hours. It is seen that the decay peak is shifted to lower values (enhanced decay time).

Figure 2:
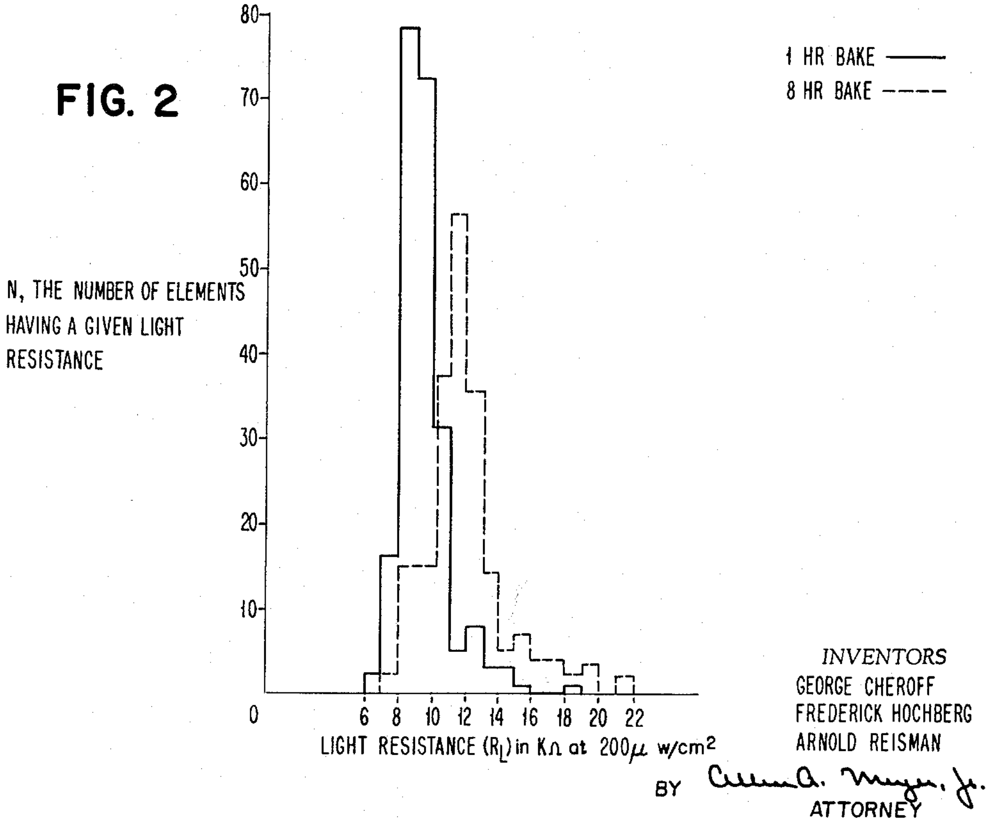

FIGURE 2 shows the distribution in light resistance accompanying these two treatments. It is observed that the 8 hour distribution exhibits a slightly higher average light resistance.

*Example 1*

220 CdSe sintered layer photoconductor elements doped with 175 p.p.m. Cu are baked in air at 165° C. without first overcoating with silver electrodes for 4 hours. The silver land patterns are affixed and the assemblies are baked for 1 hour in air at 165° C. These properties are solely those of devices having a total baking time of 1 hour demonstrating that decay enhancement is not simply due to heat treatment.

*Example 2*

220 CdSe sintered layer photoconductor elements doped with 175 p.p.m. Cu have affixed to them silver land patterns by a standard silk screening technique. The solvent is evaporated for 15 minutes at 100° C. and then the assemblies are baked for 1 hour and measured. The assemblies are rebaked at 165° C. for an additional 3 hours and measured. After the 4 hour treatment there are no samples with decay times greater than 90 milliseconds. Whereas at one hour, 95 elements exhibited decay times greater thatn 90 milliseconds.

*Example 3*

The same treatment as performed in Example 2 is repeated on 220 elements excepting that measurements are made at 1 and 6 hours. After 6 hours no photoconductor exhibited a decay time greater than 60 microseconds.

*Example 4*

The procedure of Example 2 is repeated except that measurements are made after 1 and 8 hours. After 8 hours only 9 elements exhibited a decay time greater than 35 microseconds, FIGURE 1.

*Example 5*

The procedures of Examples 2 and 4 are repeated and light resistances are measured. The peak distribution shifts to higher light resistance by about 20%, FIGURE 2.

*Example 6*

CdSe sintered layer photoconductors doped with 400 p.p.m. Cu are overlaid with silver land patterns and baked for 2 hours at 165° in air, measured, and then baked for 2 hours longer. Whereas, the 2 hour bake shows elements having decay times up to 90 microseconds. The 4 hour results show no element with a decay time greater than 35 microseconds. The light resistance shows less than a 20% increase in peak value.

*Example 7*

The process of Example 2 is repeated except that the bakings were accomplished in an He atmosphere at 165° C. The elements exhibited the same change in characteristics as described in Example 2 demonstrating that $O_2$ is not responsible for the changes in characteristics.

The process of the invention involves controlled diffusion of a monovalent impurity into CdSe sintered layer photoconductors to effectively remove deep trapping states and at the same time have a minor effect on majority carrier lifetime so as to enhance decay characteristics without markedly affecting sensitivity.

Silver electrodes are applied at room temperature and function as interconnections and a source of impurity atoms which enhance decay time in the final state of a photoconductor polycrystalline sintered layer fabrication process when the assemblies are heat treated for several hours at 165° C.

While the invention has been particularly shown and described with reference to preferred embodiments thereof, it will be understood by those skilled in the art that various changes in form and details may be made therein without departing from the spirit and scope of the invention.

What is claimed is:

1. A process for increasing the room temperature stability of binary compound photoconductor polycrystalline layers while at the same time providing an electrode structure therefor which comprises diffusing a monovalent cation into a bivalent cation lattice bulk of the binary compound photoconductor polycrystalline layers while maintaining a temperature of 165° C. to less than 200° C.

2. A process for increasing the stability of cadmium selenide photoconductor polycrystalline layers while at the same time providing an electrode structure therefor which comprises diffusing silver into a cadmium selenide lattice while maintaining a temperature of 165° C. to less than 200° C. to produce thereby more stable metastable vacancies in the lattice structure.

3. A process for preparing cadmium selenide polycrystalline sintered layer photoconductors having enhanced decay time characteristics and long term stability which comprises:

(1) providing a sintered cadmium selenide photoconductor layer;
(2) mixing silver particles with a binder and a volatile vehicle;
(3) screening the silver particle mixture as an electrode pattern on the sintered cadmium selenide photoconductor layer at room temperature;
(4) drying the assembly to remove the volatile vehicle;
(5) heating the dried assembly at a temperature of 165° C. to less than 200° C. until a specific enhanced decay time is obtained.

4. A process for preparing cadmium selenide sintered layer polycrystalline photoconductors having enhanced decay time characteristics and long term stability which comprises:

(1) providing a sintered cadmium selenide photoconductor layer;
(2) mixing silver particles in the range of sizes 200–400 mesh with an epoxy resin binder, curing agent and volatile vehicle;
(3) screening this slurry mixture on the sintered layer polycrystalline photoconductor at room temperature;
(4) drying this assembly at 100° C.–110° C. for 15 minutes to remove the volatile vehicle;
(5) heating the assembly at approximately 165° C. for 1–20 hours to acquire a predetermined dark resistance.

5. An improved photoconductive device comprising at least one binary compound photoconductor polycrystalline layer and at least one electrode layer consisting essentially of a monovalent cation diffused into a bivalent cation lattice bulk of said photoconductor layer having metastable vacancies stabilized to increase room temperature stability.

6. An improved cadmium selenide photoconductor device comprising at least one cadmium selenide photoconductor crystalline layer and at least one silver electrode layer consisting essentially of a silver cation diffused into a cadmium selenide lattice bulk of said photoconductor layer having metastable vacancies stabilized to increase room temperature stability.

7. A process for increasing the room temperature stability of binary compound photoconductor polycrystalline layers while at the same time providing an electrode structure therefor which comprises diffusing a monovalent cation into a bivalent cation lattice bulk of the binary compound photoconductor polycrystalline layers while maintaining a temperature of approximately 165° C. for 1–20 hours.

8. A process for increasing the stability of cadmium selenide photoconductor polycrystalline layers while at the same time providing an electrode structure therefor which comprises diffusing silver into a cadmium selenide lattilce while maintaining a temperature of approximately 165° C. for 1–20 hours to produce thereby more stable metastable vacancies in the lattice structure.

References Cited by the Examiner

UNITED STATES PATENTS

| | | | |
|---|---|---|---|
| 2,765,385 | 10/56 | Thomsen | 117—212 |
| 2,856,541 | 10/58 | Jacobs | 250—211 |
| 2,879,182 | 3/59 | Pakswer et al. | 252—501 X |
| 2,963,390 | 12/60 | Dickson | 250—211 X |
| 2,994,621 | 8/61 | Hugle et al. | 252—501 X |
| 2,999,240 | 9/61 | Nicoll | 117—212 |
| 3,108,021 | 10/63 | Stanley | 117—212 |

RALPH G. NILSON, *Primary Examiner.*

WALTER STOLWEIN, *Examiner.*